(12) United States Patent
Menon et al.

(10) Patent No.: US 9,262,180 B2
(45) Date of Patent: Feb. 16, 2016

(54) METHOD AND APPARATUS FOR RECOMMENDING PRODUCT FEATURES IN A SOFTWARE APPLICATION IN REAL TIME

(75) Inventors: Anand M. Menon, Noida (IN); Gaurav Singh, New Delhi (IN); Anuj Mittal, Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 119 days.

(21) Appl. No.: 13/456,948

(22) Filed: Apr. 26, 2012

(65) Prior Publication Data

US 2013/0290944 A1    Oct. 31, 2013

(51) Int. Cl.
*G06F 9/44* (2006.01)

(52) U.S. Cl.
CPC .................................... *G06F 9/4446* (2013.01)

(58) Field of Classification Search
CPC . G06F 3/0481; G06F 3/0482; G06F 17/3028; G06F 3/0488
USPC .......................................... 717/105, 108, 140
See application file for complete search history.

(56) References Cited

U.S. PATENT DOCUMENTS

| | | | |
|---|---|---|---|
| 7,593,603 B1* | 9/2009 | Wilensky | 382/311 |
| 2002/0052551 A1* | 5/2002 | Sinclair et al. | 600/476 |
| 2003/0063779 A1 | 4/2003 | Wrigley | |
| 2004/0208475 A1* | 10/2004 | Ohmura | H04N 1/00183 386/224 |
| 2008/0175460 A1 | 7/2008 | Reiner | |
| 2008/0250323 A1* | 10/2008 | Huff | G06F 9/4446 715/733 |
| 2009/0089751 A1* | 4/2009 | Raikes et al. | 717/120 |
| 2010/0086278 A1* | 4/2010 | Stankiewicz et al. | 386/52 |
| 2010/0281362 A1* | 11/2010 | Bailor et al. | 715/256 |
| 2011/0145787 A1* | 6/2011 | Brunswig et al. | 717/120 |

OTHER PUBLICATIONS

Ottalingam T. Satyanarayanan, "Software Image Management for Large Networks", Cisco Systems, May 10, 2002, 5 pgs.

* cited by examiner

*Primary Examiner* — Duy Khuong Nguyen
(74) *Attorney, Agent, or Firm* — Keller Jolley Preece (57) ABSTRACT

A computer implemented method and apparatus for recommending product features in a software application in real time comprising analyzing an object to detect at least one issue to be addressed in the object; identifying at least one user action taken to address the at least one issue in the object; accessing a recommendations library to find at least one recommendation to address the at least one issue in the object; and displaying the at least one recommendation.

17 Claims, 4 Drawing Sheets

METHOD AND APPARATUS FOR RECOMMENDING PRODUCT FEATURES IN A SOFTWARE APPLICATION IN REAL TIME

BACKGROUND OF THE INVENTION

1. Field of the Invention

Embodiments of the present invention generally relate to software usage and, more particularly, to a method and apparatus for recommending product features in a software application in real time.

2. Description of the Related Art

Software companies frequently release updated versions of software containing new and/or improved features. Although a software developer has gone to great efforts to simplify complex user workflows through new and easy-to-use features, it often takes up to two or three subsequent releases for users to fully understand, appreciate and own any new feature as their favored workflow for daily use. A user may needlessly perform repetitive actions of an old tedious workflow when a new feature exists that obviates the old workflow. Because the user is either unaware of the new feature or unsure how or when to use the new feature in the currently workflow, the new feature goes underutilized.

Current efforts involve the use of advertisements for new features and/or videos made available on public forums that explain the new features to users. However, users tend to remain faithful to old features they are used to and are confident using.

Therefore, there is a need for a method and apparatus for recommending product features in a software application in real time.

SUMMARY OF THE INVENTION

Embodiments of the present invention generally relate to a method and apparatus for recommending product features in a software application in real time. The method comprises analyzing an object in order to detect at least one issue to be addressed in the object. The method identifies at least one user action taken to address the at least one issue in the object. Then, upon accessing a recommendation library to find at least one recommendation for how to address the at least one issue in the object, the method displays the at least one recommendation.

While the method and apparatus is described herein by way of example for several embodiments and illustrative drawings, those skilled in the art will recognize that the method and apparatus for recommending product features in a software application in real time is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for recommending product features in a software application in real time defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for recommending product features in a software application in real time. The embodiments analyze a digital object, which could be a web design, an image, an artwork, a document, an electronic publication, a professional video, interactive content, animation, and/or the like, and detect at least one issue in the object that may be improved by a workflow or feature of the software application. A scan is performed to determine what actions a user has taken to correct these detected issues. The information regarding the detected issues and the user actions are compared to a recommendation library to determine what features of the software application are recommended to be used to address the issues in the object. If, based on the user actions taken, the user is already using the recommended feature, the method ends. However, if a workflow or feature exists in the recommendation library that could assist the user, the recommendation is displayed. The recommendation may include a current product feature the user has not taken advantage of to solve the issue or it could be a recommendation to upgrade to a latest version of the software which contains helpful new features, or it may be an advertisement of a feature in an upcoming release of the software. Advantageously, embodiments of the present invention provide recommending product features in a software application in real time. As used herein, the term "feature" also includes a plurality of actions (i.e., a workflow) for accomplishing a desired end result.

Various embodiments of a method and apparatus for recommending product features in a software application in real time are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
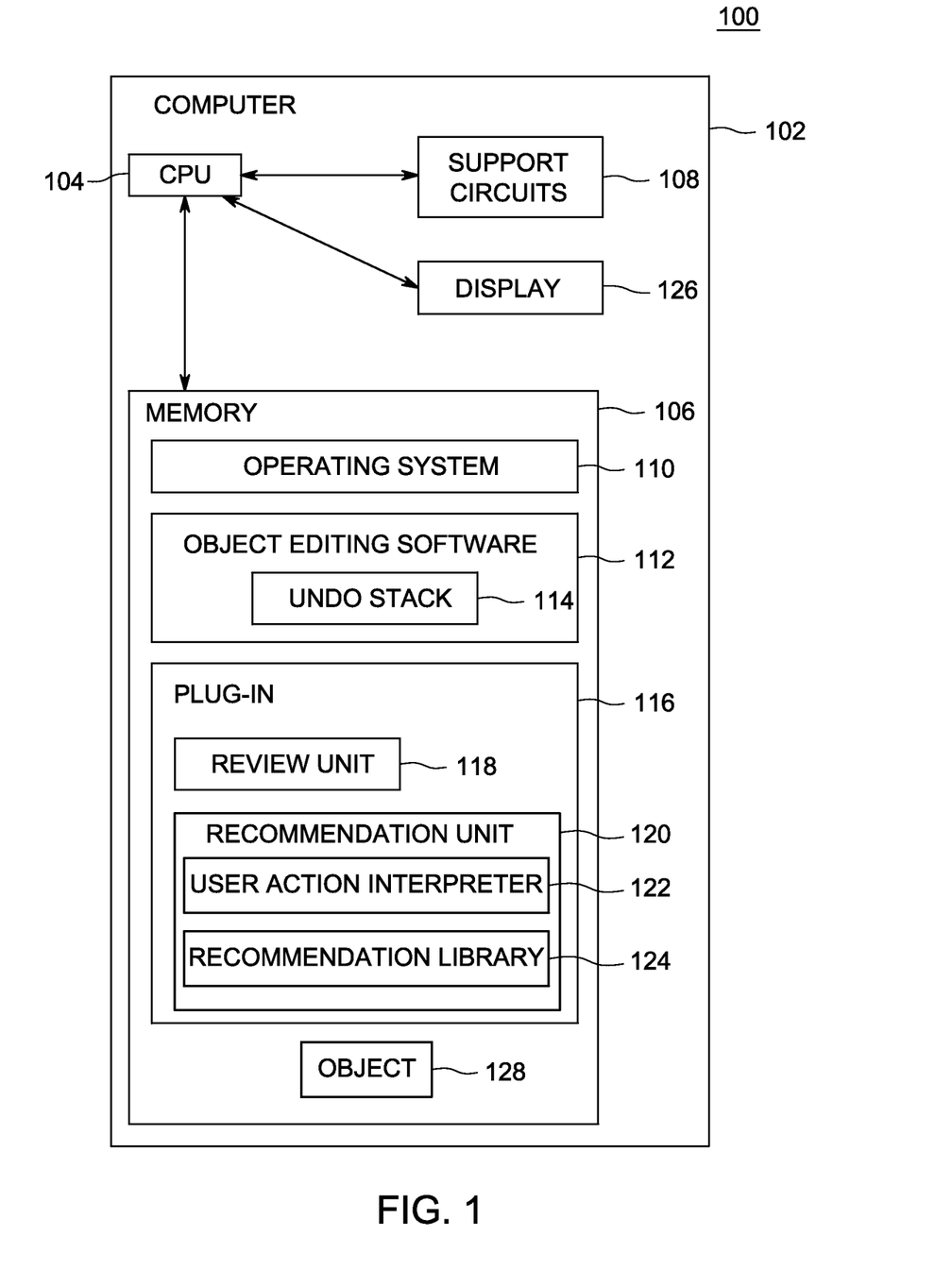
FIG. 1 is a block diagram of a system for recommending product features in a software application in real time, according to one or more embodiments.

FIG. 1 is a block diagram of a system 100 for recommending product features in a software application in real time, according to one or more embodiments. The system 100 comprises a computer 102. The computer 102 comprises a Central Processing Unit (or CPU) 104, a memory 106, a display 126, and support circuits 108. The CPU 104 may comprise one or more commercially available microprocessors or microcontrollers that facilitate data processing and storage. The various support circuits 108 facilitate the operation of the CPU 104 and include one or more clock circuits, power supplies, cache, input/output circuits, and the like. The memory 106 comprises at least one of Read Only Memory (ROM), Random Access Memory (RAM), disk drive storage, optical storage, removable storage and/or the like.

The memory 106 further comprises object editing software 112, a plug-in 116 and an Operating System 110. The operating system 110 may comprise various commercially known operating systems. The object editing software 112 may be any software application, such as ADOBE® PHOTOSHOP® LIGHTROOM® or ADOBE® PHOTOSHOP® Elements, ADOBE® Illustrator, ADOBE® InDesign, ADOBE® Acrobat, ADOBE® AfterEffects, ADOBE® Edge, ADOBE® Flash, ADOBE® Muse, ADOBE® DreamWeaver, and the like, capable of creating an object 128 and allowing multiple undo actions, hence providing for the presence of an undo stack 114. For example, the object 128 could be a web design, an image, an artwork, a document, an electronic publication, a professional video, interactive content, animation, and/or the like. The invention will be described using as an exemplary embodiment, a digital photograph.

The object editing software 112 comprises an undo stack 114. The object editing software 112 loads the plug-in 116 into the memory 106. The plug-in comprises a review unit 118 and a recommendation unit 120. The recommendation unit 120 comprises a user action interpreter 122 and a recommendation library 124. The review unit 118 is capable of analyzing digital objects, and in response provides necessary inputs to the system 100. More specifically, the review unit 118 provides a file that contains key-value pairs for various parameters of the object which denote the presence or absence of issues to be fixed. In the exemplary embodiment, the object is a digital photograph. In this embodiment, as a result of the analysis, an .XML file is created which may contain key-value pairs such as Key=Exposure|Value=OverExposed, Key=DegreeOfExposure|Value=60, Key=Redeye|Value=No. The .XML file is used as an input to the recommendation unit 122. The recommendation unit 120 takes the .XML file and scans user actions using the user action interpreter 122, which inspects the undo stack 114 to see what actions the user has taken to address the issues detected in the .XML file. The recommendation unit 120 analyzes the input it receives from the user action interpreter 122 and the review unit 118 and accesses the recommendations library 124. The recommendations library 124 contains workflows and features of the object editing software 112 that might be used to address the issues detected by the review unit 118. If the user actions found in the undo stack 114 matches the workflow that would be recommended to address the issues found, the system 100 does not interrupt the user with a recommendation. However, if the scan of the user actions show that the user is not taking advantage of some object editing software features found in the recommendation library 124 that might be helpful in addressing the issues found by the review unit 118, the recommendation unit 120 displays a recommendation of alternative actions or features the user may wish to utilize to address the issues found in the object. As such, the user is notified of product features in real time, i.e., while the user is editing the object. The recommendations library 124 is refreshed every time a new feature is finalized and ready to be recommended or advertised to users. Further, when an existing subscription user runs the object editing software 112 after renewing the user's subscription, the recommendations library 124 is refreshed with any newly added features available with the user's renewed subscription.

Figure 2:
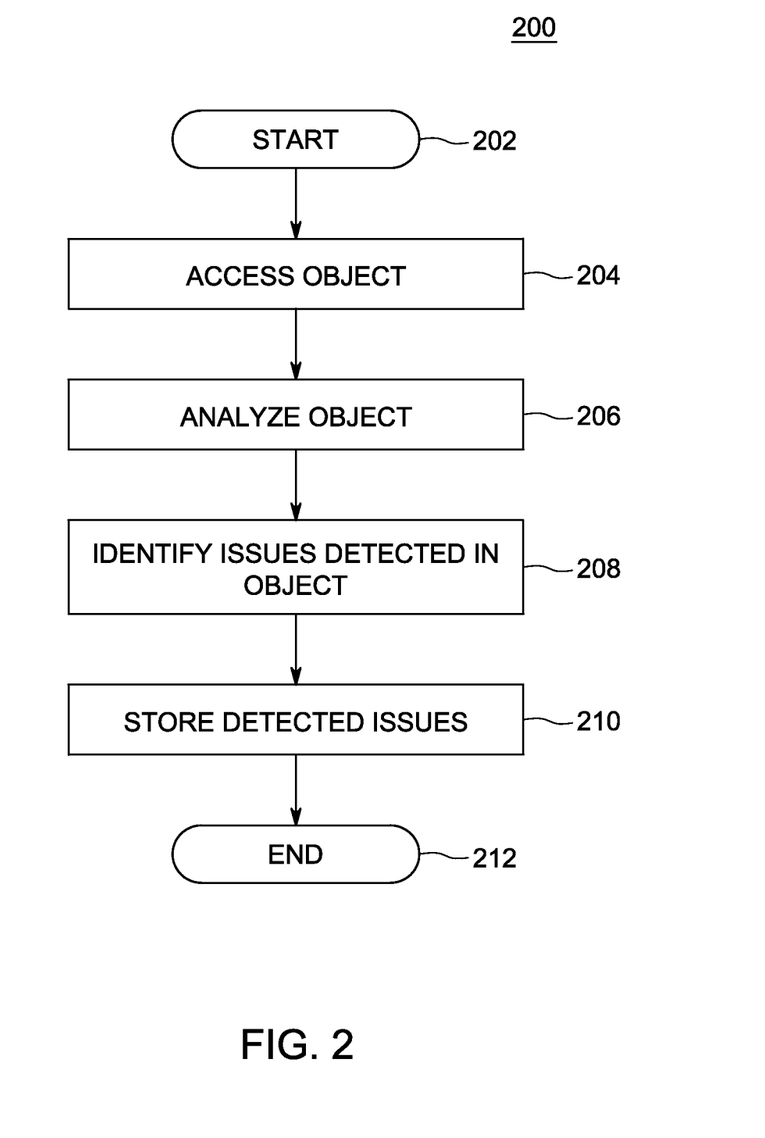
FIG. 2 depicts a flow diagram of a method for analyzing an object as performed by the review unit of FIG. 1, according to one or more embodiments.

FIG. 2 depicts a flow diagram of a method 200 for analyzing an object as performed by the review unit 118 of FIG. 1, according to one or more embodiments. The method 200 reviews different aspects of the object and produces a file containing key-value pairs that identify detected issues that might be addressed in the object.

The method 200 starts at step 202, and proceeds to step 204. At step 204, the method 200 accesses an object. The object may be a CAD drawing, a document, a web design, or any digital object as described above. In one embodiment, the object is a digital photograph. The method 200 proceeds to step 206. At step 206, the method 200 analyzes the object. The method 200 interprets parameters such as, but not limited to, the grayscale histogram, noise detection, or metadata available in the photograph, to address issues such as over- or under-exposure, red-eye, lighting issues and the like. The method 200 proceeds to step 208.

At step 208, the method 200 creates a file that identifies key-value pairs for the issues detected during the analysis. In some embodiments, the file is an .XML file. In this embodiment, as a result of the analysis of the photograph, the .XML file may contain key-value pairs such as Key=Exposure|Value=OverExposed, Key=DegreeOfExposure|Value=60, Key=Redeye|Value=No. The file is used as an input to the recommendation unit. The method 200 proceeds to step 210.

At step 210, the method 200 stores the file of key-value pairs identifying the detected issues. The method 200 proceeds to step 212 and ends.

Figure 3:
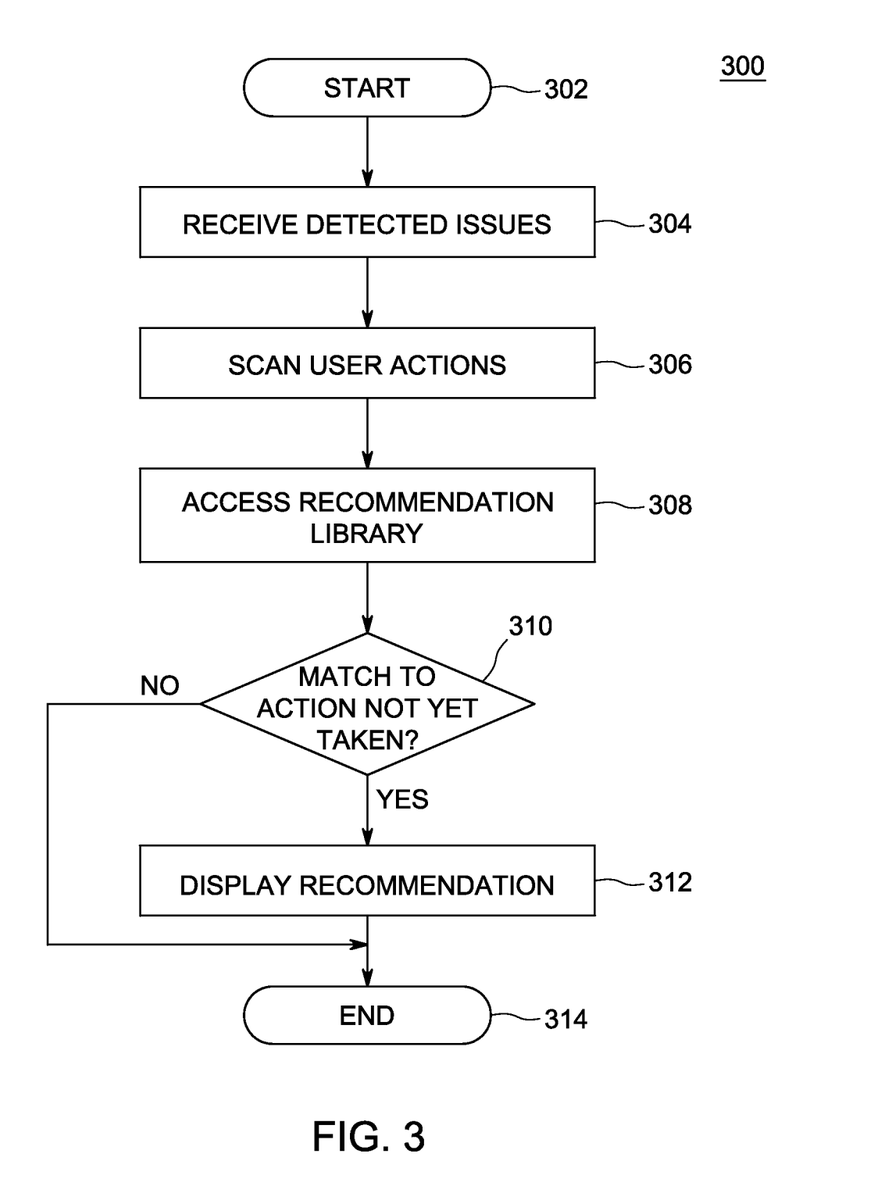
FIG. 3 depicts a flow diagram of a method for recommending product features as performed by the recommendation unit of FIG. 1, according to one or more embodiments.

FIG. 3 depicts a flow diagram of a method 300 for recommending product features as performed by the recommendation unit 120 of FIG. 1, according to an embodiment of the invention. The method 300 recommends best-fit features and workflow to fix the issues that were detected in method 200 above. The method 300 analyzes detected issues with the object and actions the user has taken to address the detected issues. The method 300 then accesses a recommendation library to find what features or actions can be utilized to address the detected issues. If the user has not yet taken such action, the method 300 displays the recommendation to the user. The method 300 may also identify and advertise features already under development for an upcoming release of the product that may be useful to the user in the future. While the exemplary embodiments refer to ADOBE® Photoshop®, the method 300 may be utilized for any software application that enables editing of an object file and creates an undo stack.

The method 300 starts at step 302, and proceeds to step 304. At step 304, the method 300 receives the stored detected issues identified by method 200 above. The method 300 proceeds to step 306. At step 306, the method 300 scans a user's actions to determine what actions have already been taken by the user to address the detected issues. The method 300 inspects a history of user actions contained in an undo stack to detect patterns and to determine if certain features are being utilized. For example, in ADOBE® Photoshop®, an image analysis may detect the presence of over or under exposure. A scan of the undo stack reveals the user actions as "Levels"→"Curves"→"Brightness/Contrast". The method 300 proceeds to step 308.

At step 308, the method 300 accesses a recommendation library to determine what actions are recommended to address the detected issues. In the above example, the recommendation database contains an entry for over/under exposure which recommends the actions "Levels" and/or "Curves" and/or "Brightness/Contrast" as a way to best address the defects in exposure. The method 300 proceeds to step 310. At step 310, the method 300 determines if there is a workflow or feature that can be used to address the detected issues that the user has not used. In the present example, the method 300 compares the user actions to the workflow recommended in the recommendation database. Because the user actions reveal that one or more of the features recommended in the recommendation database has been employed on the image that suffers from exposure issues, the method 300 does not interrupt the user. The method 300 proceeds to step 314 and ends.

At step 310, if the method 300 finds a recommendation in the recommendation library and finds that the user has not taken such action, the method 300 proceeds to step 312. At step 312, the method 300 displays the recommendation to the user. The recommendation may include a workflow or a feature for the user to utilize to address the detected issue. However, the recommendation may also include an advertisement to inform the user about a new feature expected in an upcoming release of the object editing software, along with marketing details such as ship-date and any discounts that the user can avail on pre-booking. For Example, in ADOBE® Photoshop®, an analysis of the undo stack may reveal a user has used the "Clone Stamp" tool an inordinate number of times. This threshold number may be specified based on the software application. Upon analysis of the occurrences in the undo stack, the method 300 looks for a recommendation in the recommendation database. The recommendation database may contain a relatively new feature called "Content-Aware Fill" that is included in the application of which the user may not be aware. Display of the "Content-Aware Fill" recommendation reveals instead of the repeated "Clone Stamp" workflow, a more optimized workflow of "Select"→"Fill with Content-Aware option set"→"Deselect" may be utilized. The method 300 proceeds to step 314 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java.®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
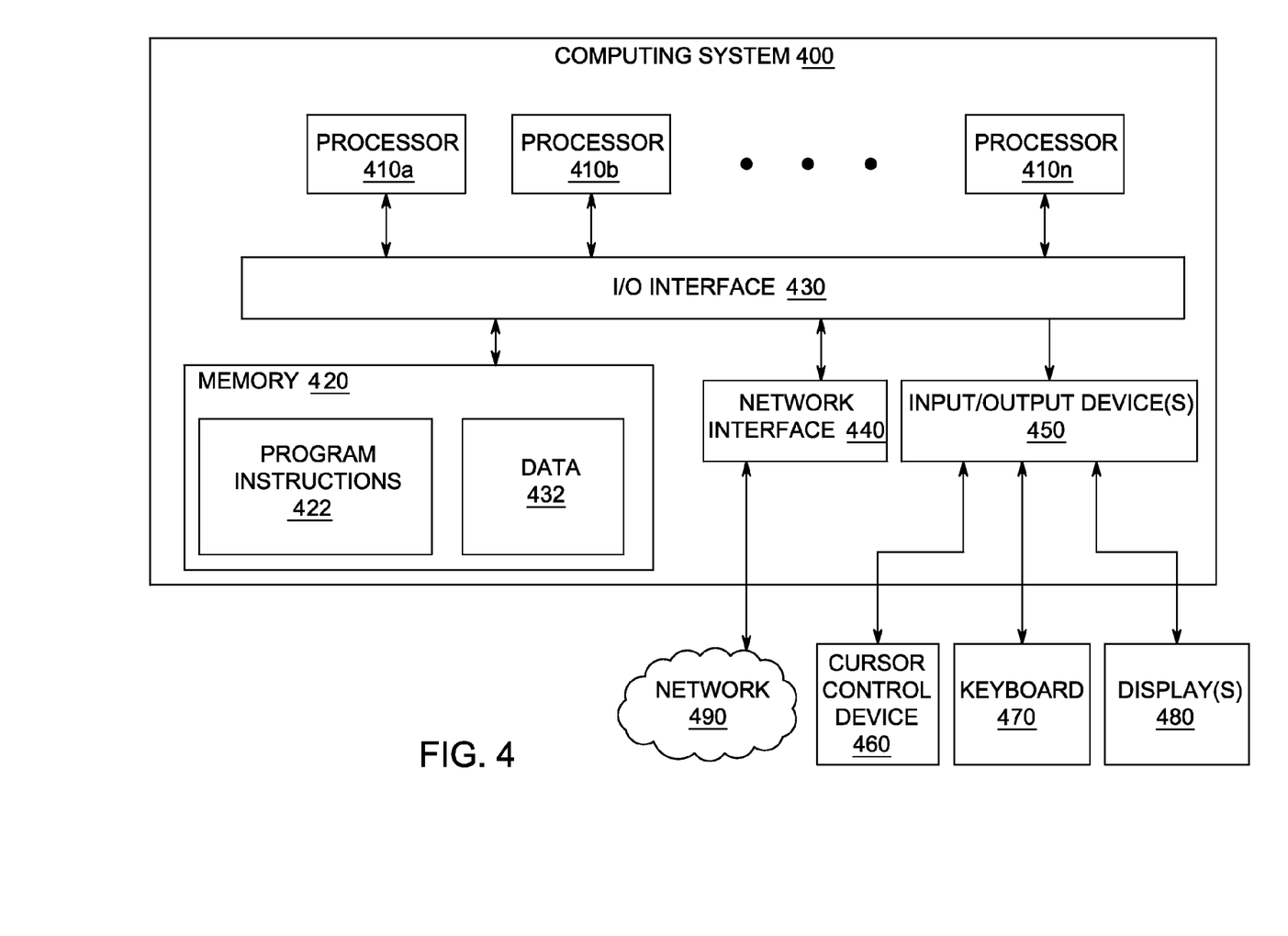
FIG. 4 depicts a computer system that can be utilized in various embodiments of the present invention, according to one or more embodiments.

FIG. 4 depicts a computer system that can be utilized in various embodiments of the present invention, according to one or more embodiments.

Various embodiments of an apparatus and method for recommending product features in a software application in real time, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement methods 200 and 300, as processor-executable executable program instructions 422 (e.g., program instructions executable by processor(s) 410a-n) in various embodiments.

In the illustrated embodiment, computer system 400 includes one or more processors 410a-n coupled to a system memory 420 via an input/output (I/O) interface 430. The computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410a-n may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410a-n may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowcharts of FIGS. 2 and 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for recommending product features comprising:
    analyzing an object using an object editing software application to detect an issue to be addressed in the object;
    identifying a user action that has been taken using the object editing software application to address the detected issue in the object, wherein the user action corresponds to a first workflow or feature of the object editing software application;
    accessing a recommendations library to identify one or more workflows or features of the object editing software application capable of addressing the detected issue in the object;
    comparing the first workflow or feature that corresponds with the user action with the identified one or more workflows or features capable of addressing the detected issue;
    determining, based on the comparison, at least one alternative workflow or feature recommendation from among the identified one or more workflows or features capable of addressing the detected issue, wherein the at least one alternative workflow or feature recommendation is different from, and includes less user steps than, the first workflow or feature that corresponds with the user action; and
    displaying the at least one alternative workflow or feature recommendation.

2. The method of claim 1, wherein the object is a digital photograph.

3. The method of claim 1, wherein analyzing the object comprises creating a file containing a plurality of key-value pairs identifying data, at least one of the key-value pairs pertaining to the object.

4. The method of claim 1, wherein identifying the user action comprises inspecting an undo stack.

5. The method of claim 1, further comprising determining whether the at least one alternative workflow or feature recommendation of the object editing software application is better than the first workflow or feature in addressing the detected issue.

6. The method of claim 1, wherein the at least one alternative workflow or feature recommendation is a workflow or feature that is not in a current release of the object editing software application, but will be in a next release of the object editing software application.

7. A non-transitory computer-readable storage medium comprising one or more processor executable instructions that, when executed by at least one processor, causes the at least one processor to perform a method of recommending product features comprising:
    analyzing an object using object editing software to detect an issue to be addressed in the object;
    identifying a user action that has been taken using the object editing software to address the detected issue in the object, wherein the user action corresponds to a first workflow or feature of the object editing software application;
    accessing a recommendations library to identify one or more workflows or features of the object editing software capable of addressing the detected issue in the object;
    comparing the first workflow or feature that corresponds with the user action with the identified one or more workflows or features capable of addressing the detected issue;
    determining, based on the comparison, at least one alternative workflow or feature recommendation from among the identified one or more workflows or features capable of addressing the detected issue, wherein the at least one alternative workflow or feature recommendation is different from, and includes less user steps than, the first workflow or feature that corresponds with the user action; and displaying the at least one alternative workflow or feature recommendation.

8. The non-transitory computer-readable medium of claim 7, wherein the object is a digital photograph.

9. The non-transitory computer-readable medium of claim 7, wherein analyzing the object comprises creating a file containing a plurality of key-value pairs identifying data, at least one of the key-value pairs pertaining to the object.

10. The non-transitory computer-readable medium of claim 7, wherein identifying the user action comprises inspecting an undo stack.

11. The non-transitory computer-readable medium of claim 7, further comprising executable instructions that, when executed, cause the processor to determine whether the at least one alternative workflow or feature recommendation of the object editing software is better than the first workflow or feature in addressing the detected issue.

12. The non-transitory computer-readable medium of claim 7, wherein the at least one alternative workflow or feature recommendation is a workflow or feature that is not in a current release of the object editing software, but will be in a next release of the object editing software.

13. A computer-implemented method for recommending product features of a software application to a user, the method comprising:
   detecting, using at least one processor, an issue to be addressed in an object;
   identifying, using the at least one processor, a user action that addresses the detected issue in the object, wherein the user action is associated with a first workflow or feature of the software application;
   in response to identifying the user action, comparing the first workflow or feature to one or more additional workflows or features of the software application capable of addressing the detected issue in the object;
   determining, based on the comparison, at least one alternative workflow or feature recommendation from among the one or more additional workflows or features, wherein the at least one alternative workflow or feature recommendation is different from, and includes less user steps than, the first workflow or feature associated with the user action; and
   displaying the at least one alternative workflow or feature recommendation.

14. The method of claim 13, wherein the object is a digital photograph.

15. The method of claim 13, wherein identifying the user action that addresses the detected issue in the object comprises analyzing an undo stack.

16. The method of claim 13, wherein the one or more additional workflows or features are maintained within a recommendation library.

17. The method of claim 13, further comprising determining whether the one or more additional workflows or features address the detected issue better than the first workflow or feature that is associated with the user action.

* * * * *